(12) United States Patent   (10) Patent No.: US 11,155,492 B2
Ikadai et al.                    (45) Date of Patent:       Oct. 26, 2021

(54) COVER GLASS AND DISPLAY USING SAME

(71) Applicant: Nippon Sheet Glass Company, Limited, Tokyo (JP)

(72) Inventors: Masahiro Ikadai, Kyoto (JP); Shunji Wada, Kanagawa (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 331 days.

(21) Appl. No.: 16/307,384

(22) PCT Filed: Aug. 29, 2017

(86) PCT No.: PCT/JP2017/031021
§ 371 (c)(1),
(2) Date: Dec. 5, 2018

(87) PCT Pub. No.: WO2018/055998
PCT Pub. Date: Mar. 29, 2018

(65) Prior Publication Data
US 2019/0300425 A1    Oct. 3, 2019

(30) Foreign Application Priority Data

Sep. 23, 2016 (JP) .............................. JP2016-185182

(51) Int. Cl.
*C03C 17/32* (2006.01)
*B32B 17/10* (2006.01)
*G06F 1/18* (2006.01)
*G06F 9/00* (2006.01)
*G09F 9/00* (2006.01)

(52) U.S. Cl.
CPC .............. *C03C 17/32* (2013.01); *B32B 17/10* (2013.01); *G06F 1/181* (2013.01); *G09F 9/00* (2013.01)

(58) Field of Classification Search
None
See application file for complete search history.

(56) References Cited

U.S. PATENT DOCUMENTS

2003/0211333 A1   11/2003 Watanabe et al.
2009/0185100 A1   7/2009 Matsuhira et al.
(Continued)

FOREIGN PATENT DOCUMENTS

CN    1441453     9/2003
JP    H0450144 A  2/1992
(Continued)

OTHER PUBLICATIONS

Extended European Search Report issued for European Patent Application No. 17852777.6, dated May 4, 2020, 6 pages.
(Continued)

*Primary Examiner* — Ramsey Zacharia
(74) *Attorney, Agent, or Firm* — Hamre, Schumann, Mueller & Larson, P.C

(57) ABSTRACT

A cover glass (10) includes a glass layer (16), a viscoelastic layer (12), and an acoustic impedance adjusting layer (14) disposed between the glass layer (16) and the viscoelastic layer (12). When acoustic impedance of the glass layer (16) is Zg, acoustic impedance of the acoustic impedance adjusting layer (14) is Zm, and acoustic impedance of the viscoelastic layer (12) is Zd, the cover glass (10) satisfies a relationship of Zg>Zm>Zd.

10 Claims, 3 Drawing Sheets

(56) References Cited

U.S. PATENT DOCUMENTS

| | | | |
|---|---|---|---|
| 2016/0016845 A1 | 1/2016 | Cho et al. | |
| 2016/0083282 A1* | 3/2016 | Jouanno | B32B 37/08 156/102 |
| 2018/0082669 A1* | 3/2018 | Lu | G10K 11/168 |

FOREIGN PATENT DOCUMENTS

| | | |
|---|---|---|
| JP | H0881238 A | 3/1996 |
| JP | 2009122655 A | 6/2009 |
| JP | 3196581 U | 3/2015 |
| JP | 2016088828 A | 5/2016 |
| JP | 2016513612 A | 5/2016 |
| WO | 2011096467 A1 | 8/2011 |
| WO | 2015042112 | 3/2015 |

OTHER PUBLICATIONS

International Search Report issued for International Patent Application No. PCT/JP2017/031021 dated Oct. 17, 2017, 5 pages including English translation.

\* cited by examiner

COVER GLASS AND DISPLAY USING SAME

TECHNICAL FIELD

The present invention relates to a cover glass used for protecting a display.

BACKGROUND ART

In recent years, cover glasses (thin glass sheets) for protecting displays are commonly used on displays of mobile devices such as mobile phones, personal digital assistants, and tablet PCs. As displays are becoming lighter and thinner, a demand to reduce the thickness of such cover glasses is increasing. However, reduction in thickness of cover glasses results in reduction in strength thereof, and the cover glasses can thus be easily broken upon dropping a display or collision between the display surface and a metal object. Easily breakable cover glasses cannot achieve their objective of protecting displays.

Patent Literature 1 states that strengthened glass is bonded onto a display panel with a transparent adhesive. Patent Literature 2 describes a cover glass in which a glass substrate, optical clear adhesive layer (OCA layer), and PET film are laminated in this order.

CITATION LIST

Patent Literature

Patent Literature 1: JP 2009-122655 A (Paragraphs 0006 and 0007)
Patent Literature 2: JP 2016-513612 A (FIG. 1)

SUMMARY OF INVENTION

Technical Problem

Recently, further reduction in thickness of cover glasses to impart flexibility thereto has been under consideration in order to achieve flexible displays. For example, a laminated product of a glass sheet whose thickness has been reduced to 0.05 mm or less by etching and a resin layer has been considered for use as a cover glass.

For example, it is possible to prevent a cover glass from damage from dropping by improving the bending strength of the cover glass with the use of a chemically strengthened glass sheet. It is, however, difficult to prevent a cover glass from damage when a pen point or any other metal object collides with the surface of the cover glass.

In view of such circumstances, the present invention aims to provide a technique for increasing the strength of cover glasses against an impact load.

Solution to Problem

That is, the present invention provides a cover glass including:
a glass layer;
a viscoelastic layer; and
an acoustic impedance adjusting layer disposed between the glass layer and the viscoelastic layer, wherein
when acoustic impedance of the glass layer is Zg, acoustic impedance of the acoustic impedance adjusting layer is Zm, and acoustic impedance of the viscoelastic layer is Zd, a relationship of $Zg > Zm > Zd$ is satisfied.

In another aspect, the present invention provides a display including:
a display body; and
the cover glass defined above, the cover glass being attached to a screen of the display body.

Advantageous Effects of Invention

According to the above technique, the strength of the cover glass against an impact load can be increased effectively.

DESCRIPTION OF EMBODIMENT

As a result of a detailed study, the present inventors have found that the conventional cover glasses have the following problems.

Fracture occurring when a hard object collides with a glass sheet at a high velocity and small contact area is called Hertzian fracture. Hertzian fracture is fracture due to an elastic wave (shock wave) occurring at a collision. In the case of a cover glass (FIG. 1 of Patent Literature 2) having a laminated structure of a glass layer, OCA layer, and PET film, an elastic wave occurring at a collision is reflected at the interface between the glass layer and OCA layer to produce a standing elastic wave. At that time, a strong tensile stress is applied to a latent scratch on the surface of the glass layer to extend a crack, which causes fracture of the cover glass. According to a dynamic simulation, when a 5-g ball-point pen having a high-hardness steel pen point (diameter: 0.7 mm) is dropped from a height of 23 cm or more and caused to vertically collide with the surface of a cover glass, a 50-kgf or larger load is applied as impact force to the cover glass. When the ball-point pen is dropped from a height of 1 m, a load larger than 100 kgf is applied to the cover glass as impact force. The collision time is about 11 μsec.

Inside the OCA layer, the elastic wave is attenuated due to viscous deformation of the OCA layer. However, if the viscosity coefficient of the resin composing the OCA layer is small, the attenuation of the elastic wave is weak and a standing wave with a free end is formed between the glass layer/OCA layer interface and OCA layer/PET film interface. Consequently, delamination may occur at the interface between the glass layer and OCA layer or the OCA layer itself may fracture.

Hereinafter, an embodiment of the present invention will be described with reference to the drawings. The present invention is not limited to the following embodiment.

Figure 1:
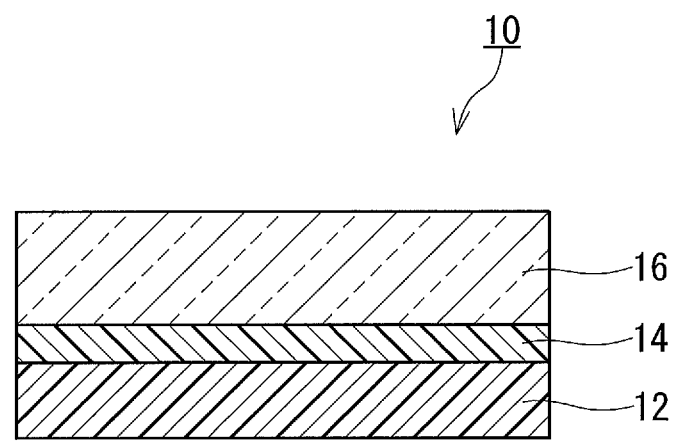
FIG. 1 is a schematic cross-sectional view of a cover glass according to an embodiment of the present invention.

As shown in FIG. 1, a cover glass 10 of the present embodiment includes a viscoelastic layer 12, acoustic impedance adjusting layer 14, and glass layer 16. The acoustic impedance adjusting layer 14 is disposed between the glass layer 16 and viscoelastic layer 12. That is, the viscoelastic layer 12, acoustic impedance adjusting layer 14, and glass layer 16 are laminated in this order. In the present embodiment, the viscoelastic layer 12 is in contact with the acoustic impedance adjusting layer 14. The acoustic impedance adjusting layer 14 is in contact with the glass layer 16. The glass layer 16 forms the outermost surface of the cover glass 10. The cover glass 10 is attached to a screen of a display body so that the viscoelastic layer 12 will be in contact with the display body directly or via another layer.

The viscoelastic layer 12 is a layer formed of a resin transparent to visible light (commonly a colorless and transparent resin). The viscoelastic layer 12 is formed of a resin material having adhesiveness, such as an acrylic adhesive. The viscoelastic layer 12 is typically formed of an optical clear adhesive film (OCA film) or UV curable optical clear resin (OCR). It is not essential for the viscoelastic layer 12 to have adhesiveness. If the viscoelastic layer 12 does not have adhesiveness, an adhesive is additionally needed to attach the cover glass 10 onto a display body.

The acoustic impedance adjusting layer 14 is a layer for matching acoustic impedance between the viscoelastic layer 12 and glass layer 16. The material of the acoustic impedance adjusting layer 14 is not particularly limited as long as the material can achieve the above function and is transparent to visible light (commonly colorless and transparent). The material composition of the acoustic impedance adjusting layer 14 is different from that of the viscoelastic layer 12. The acoustic impedance adjusting layer 14 is formed of, for example, at least one resin selected from the group consisting of polyethylene (PE), polymethyl methacrylate (PMMA), polycarbonate (PC), polypropylene (PP), polyester, polyimide, and polyamide. The polyethylene may be a high-density polyethylene and may be a low-density polyethylene. Examples of the polyester include polyethylene terephthalate (PET). Examples of the polyamide include nylon 6 and nylon 6,6. The acoustic impedance adjusting layer 14 may be formed of an inorganic material such as $SiO_2$ and BN in some cases.

The glass layer 16 is formed of, for example, a strengthened glass sheet. Examples of the strengthened glass sheet include a chemically strengthened glass sheet. The chemically strengthened glass sheet can be produced by a chemical strengthening method in which a glass sheet is treated in a melt of an alkali metal salt to impart a compressive stress to the surface layer portion of the glass sheet. The glass sheet used for the production of the chemically strengthened glass sheet is produced by, for example, float process and has composition of a known glass such as soda-lime glass and aluminosilicate glass.

When the acoustic impedance of the glass layer 16 is Zg, the acoustic impedance of the acoustic impedance adjusting layer 14 is Zm, and the acoustic impedance of the viscoelastic layer 12 is Zd, the cover glass of the present embodiment satisfies a relationship of Zg>Zm>Zd. When the respective acoustic impedance Zg, Zm, and Zd of the layers satisfy this relationship, the following effect can be obtained. That is, the interface reflection of an elastic wave generated upon impact on the surface of the cover glass 10 is suppressed, and thus the generation of a standing wave is also suppressed. Since the glass layer 16 is less likely to be subjected to a strong tensile stress, the cover glass 10 is not easily fractured. This effect is owing also to the fact that the viscoelastic layer 12 absorbs an elastic wave transmitted through the interfaces. When the viscoelastic layer 12 and acoustic impedance adjusting layer 14 are each formed of a resin material, fracture at the interface between the viscoelastic layer 12 and acoustic impedance adjusting layer 14 can be effectively prevented. Theoretically, the best effect can be obtained when the relationship of $Zm=(Zg \cdot Zd)^{1/2}$ is satisfied.

Figure 2A:
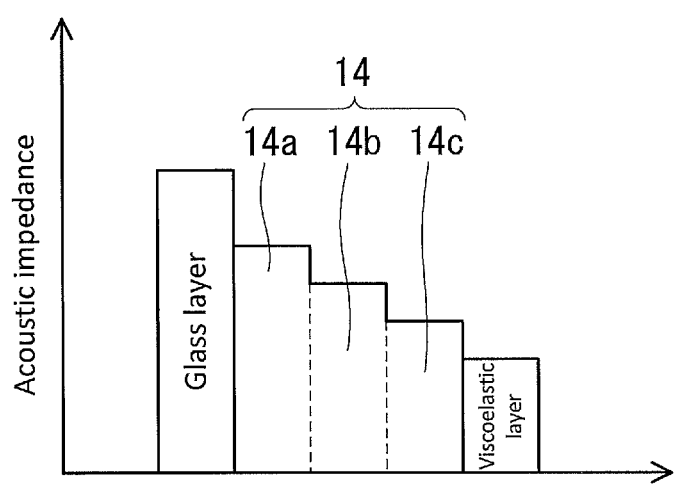
FIG. 2A is a conceptual diagram showing the distribution of acoustic impedance.

The acoustic impedance adjusting layer 14 may be a layer having a single acoustic impedance. The acoustic impedance adjusting layer 14 may also be a layer formed by laminating a plurality of layers each having a different acoustic impedance. As shown in FIG. 2A, a plurality of layers 14a to 14c forming the acoustic impedance adjusting layer 14 are laminated, for example, so as to gradually decrease the acoustic impedance from the glass layer 16 to the viscoelastic layer 12.

Figure 2B:
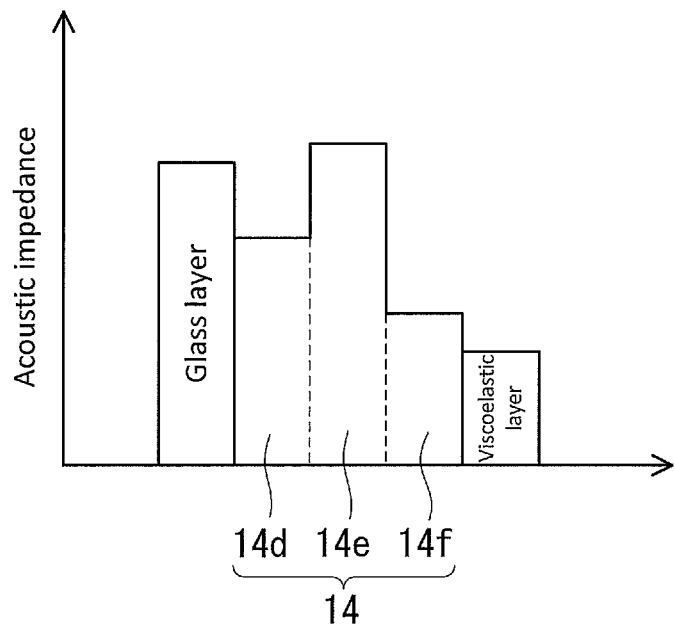
FIG. 2B is another conceptual diagram showing the distribution of acoustic impedance.

Additionally, a layer whose acoustic impedance is larger than the acoustic impedance of the glass layer 16 may be disposed between the acoustic impedance adjusting layer 14 and glass layer 16 as long as the relationship of Zg>Zm>Zd is satisfied. Moreover, as shown in FIG. 2B, when the acoustic impedance adjusting layer 14 is composed of a plurality of layers 14d to 14f, the layer 14e whose acoustic impedance is larger than the acoustic impedance of the glass layer 16 may be included in the plurality of layers 14d to 14f. In other words, the acoustic impedance adjusting layer 14 may have a laminated structure composed of at least one layer (the layers 14d and 140 satisfying the relationship of Zg>Zm>Zd and a layer (the layer 14e) whose acoustic impedance is larger than the acoustic impedance of the glass layer 16. Furthermore, a plurality of layers composing the acoustic impedance adjusting layer 14 may include a layer whose acoustic impedance is smaller than the acoustic impedance Zd of the viscoelastic layer 12.

Figure 2C:
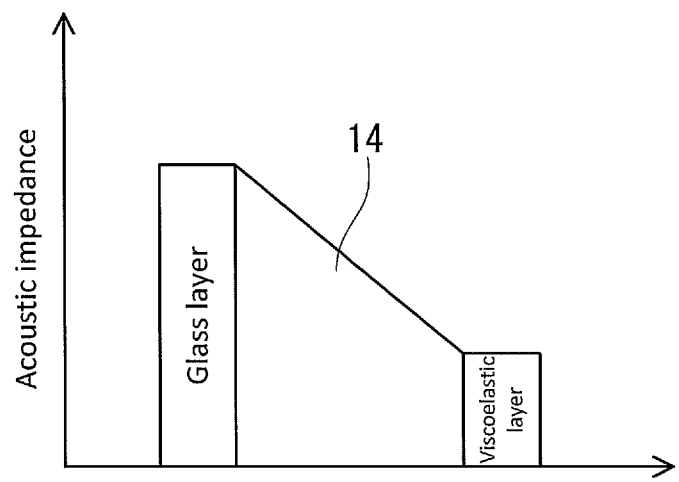
FIG. 2C is yet another conceptual diagram showing the distribution of acoustic impedance.

As shown in FIG. 2C, in the acoustic impedance adjusting layer 14, the acoustic impedance may continuously decrease from the glass layer 16 to the viscoelastic layer 12. In the acoustic impedance adjusting layer 14, the acoustic impedance may decrease lineally or non-lineally.

As represented by the following equation, the acoustic impedance Z ($kg/m^2 \cdot sec$) is defined by the product of the density ρ ($kg/m^3$) of a medium and sonic velocity c (m/sec) in the medium. In other words, the acoustic impedance Z is defined by the square root of the product of the density ρ of the medium and Young's modulus E of the medium. The medium is at ordinary temperature (20° C.±15° C.: Japanese Industrial Standards (JIS) Z 8703). The sonic velocity c in the medium can be measured with a sing-around sonic velocity measuring apparatus.

$$Z=\rho c$$

$$c=(E/\rho)^{1/2}$$

The thickness of the cover glass 10 is, for example, within the range of 0.015 to 0.15 mm.

The thickness td of the viscoelastic layer 12 is, for example, less than 0.1 mm. By sufficiently reducing the thickness of the viscoelastic layer 12, deformation of the glass layer 16 caused upon impact to the glass layer 16 can be reduced. The lower limit of the thickness td of the viscoelastic layer 12 is not particularly limited. The lower limit of the thickness td is, for example, 10 μm.

The thickness tm of the acoustic impedance adjusting layer 14 is, for example, within the range of 0.003 to 20 μm.

The thickness tg of the glass layer 16 is, for example, within the range of 0.015 to 0.15 mm. Reduction in the thickness of the glass layer 16 decreases the bending rigidity of the cover glass 10. As a result, the cover glass 10 resistant to damage from sharp bending (for example, to a curvature radius of 5 mm) can be provided. That is, the cover glass 10 can be made more suitable for a flexible display.

In the cover glass 10 of the present embodiment, the thickness tg of the glass layer 16, the thickness tm of the acoustic impedance adjusting layer 14, and the thickness td of the viscoelastic layer 12 satisfy a relationship of (tm+td) ≥0.0002 tg. The thicknesses tg, tm, and td desirably satisfy a relationship of (tm+td)≥0.2 tg. When the layers satisfy the relationship, the effect of suppressing the elastic wave reflection at the interfaces between the layers can be obtained sufficiently. The upper limit of the sum of the thicknesses tm and td is not particularly limited. The thicknesses tg, tm, and td satisfy, for example, a relationship of 2·tg≥(tm+td).

In the present embodiment, the viscosity of the viscoelastic layer 12 is within the range of 0.0001 to 20000 Pa·sec at ordinary temperature. When the viscosity of the viscoelastic layer 12 is within this range, the standing elastic wave can be effectively attenuated. The elastic modulus (tensile elastic modulus (Young's modulus)) of the viscoelastic layer 12 is, for example, within the range of 30E+3 to 5E+9 (Pa).

The viscosity and elastic modulus of the viscoelastic layer 12 respectively represent the viscosity and elastic modulus of the material forming the viscoelastic layer 12. The viscosity can be measured by, for example, an ultrasonic viscometer. The measurement principle of the ultrasonic viscometer is as follows. When an oscillator is put in a specimen and oscillated, the amplitude varies according to friction between the specimen and oscillator. An electric current is then applied externally to keep the amplitude of the oscillator constant. The viscosity can be determined from the value of the electric current applied at this time. The elastic modulus can be measured by, for example, a dynamic viscoelasticity measuring apparatus (rheometer). The measurement principle of the dynamic viscoelasticity measuring apparatus can be roughly described as follows. A stress is cyclically applied to a specimen to allow measurement of a viscoelastic modulus of the specimen from waveforms of shearing stress and a phase difference therebetween. A test piece having the same material composition as the viscoelastic layer 12 can be prepared for use in the measurement of the viscosity and elastic modulus.

EXAMPLES

Example 1

A PMMA solution was applied to the back surface of a 48-μm-thick chemically strengthened glass sheet (glanova (registered trademark) manufactured by Nippon Sheet Glass Co., Ltd.) by slit and spin coating to form a coating film, which was then dried to form a 1.3-μm-thick acoustic impedance adjusting layer. Next, a 20-μm-thick OCA film (manufactured by 3M) made of an acrylic adhesive was bonded onto the acoustic impedance adjusting layer. A cover glass of Example 1 was thus obtained.

Example 2

A 1.3-μm-thick PET film was bonded as an acoustic impedance adjusting layer to the back surface of a 48-μm-thick chemically strengthened glass sheet (glanova (registered trademark) manufactured by Nippon Sheet Glass Co., Ltd.). A transparent acrylic adhesive was used in the bonding of the PET film and glass sheet. Next, a 20-μm-thick OCA film (manufactured by 3M) made of an acrylic adhesive was bonded onto the acoustic impedance adjusting layer. A cover glass of Example 2 was thus obtained.

Example 3

A 2.2-μm-thick PET film was bonded as an acoustic impedance adjusting layer to the back surface of a 48-μm-thick chemically strengthened glass sheet (glanova (registered trademark) manufactured by Nippon Sheet Glass Co., Ltd.). A transparent acrylic adhesive was used in the bonding of the PET film and glass sheet. Next, a 20-μm-thick OCA film (manufactured by 3M) made of an acrylic adhesive was bonded onto the acoustic impedance adjusting layer. A cover glass of Example 3 was thus obtained.

Comparative Example 1

A 20-μm-thick OCA film (manufactured by 3M) made of an acrylic adhesive was bonded to the back surface of a 48-μm-thick chemically strengthened glass sheet (glanova (registered trademark) manufactured by Nippon Sheet Glass Co., Ltd.). A cover glass of Comparative Example 1 was thus obtained.

Comparative Example 2

A 25-nm-thick $Si_3N_4$ film was formed on the back surface of a 48-μm-thick chemically strengthened glass sheet (glanova (registered trademark) manufactured by Nippon Sheet Glass Co., Ltd.) by a sputtering method. Next, a 20-μm-thick OCA film (manufactured by 3M) made of an acrylic adhesive was bonded onto the $Si_3N_4$ film. A cover glass of Comparative Example 2 was thus obtained.

[Ball-Point Pen Drop Test]

Figure 3:
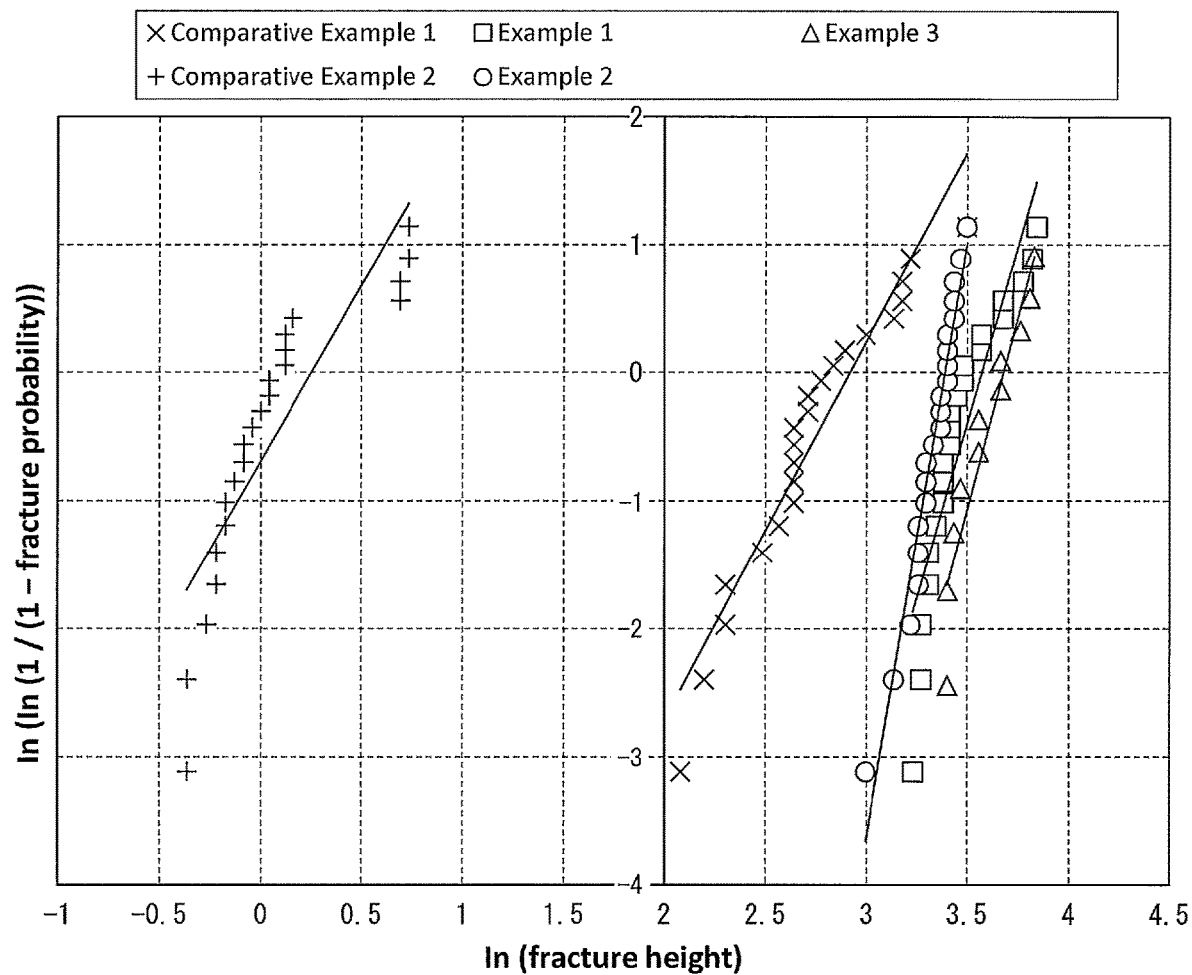
FIG. 3 is a graph showing the Weibull distribution of ball-point pen drop test results for Example 1, Example 2, Example 3, Comparative Example 1, and Comparative Example 2.

First, the cover glass of each of Examples and Comparative Examples was bonded to a PET film (thickness: 30 μm) serving as a simulated flexible display. A laminated product of the cover glass and PET film was thus obtained. Next, the laminated product was disposed on a 5-mm-thick glass sheet with the cover glass side up. A specimen for the ball-point pen drop test was thus obtained. A 5-g ball-point pen having a high-hardness steel pen point (diameter: 0.7 mm) was dropped on the surface of the cover glass to determine the height at fracture of the cover glass. Specifically, the ball-point pen was dropped toward a certain point on the cover glass, and the height at fracture of the cover glass was recorded. The dropping of the ball-point pen started from a height of 1 cm, and the drop height was increased by 1 cm. From the cover glass of each of Example 1, Example 2, Comparative Example 1, and Comparative Example 2 were prepared 22 specimens, which were subjected to the ball-point pen drop test. From the cover glass of Example 3 were prepared 11 specimens, which were subjected to the ball-point pen drop test. The test results are shown in Table 1 and FIG. 3. FIG. 3 shows the Weibull distribution of the test results. The column headed "B10 (/cm)" in Table 1 shows the height at fracture of 10% of the specimens.

[Intensity Transmittance of Shock Wave]

The intensity transmittance of a shock wave propagating from the glass layer to the OCA layer in the cover glass of each of Examples and Comparative Examples was theoretically calculated using the acoustic impedance of each layer. The results are shown in Table 1.

TABLE 1

|  | Structure | Intensity transmittance of shock wave (%) | B10 (/cm) (Weibull distribution data) | Average fracture height (cm) (Weibull distribution data) |
|---|---|---|---|---|
| Example 1 | Glass/PMMA/OCA | 13 | 23.6 | 32.8 |
| Example 2 | Glass/PET/OCA | 12 | 23.3 | 28.1 |
| Example 3 | Glass/PET/OCA | 12 | 27.2 | 36.7 |
| Comparative Example 1 | Glass/OCA | 5 | 8.6 | 16.5 |
| Comparative Example 2 | Glass/$Si_3N_4$/OCA | 2 | 0.6 | 1.1 |

The average fracture height in Examples 1 to 3 greatly exceeded the average fracture height in Comparative Examples 1 and 2. The average fracture height in Example 3 was the greatest. It can be thought that the elastic wave reflection at the interfaces was suppressed by the impedance matching between the glass layer and viscoelastic layer and thus the stress applied to a crack on the surface of the glass layer was decreased, which resulted in the increase in the average fracture height. In Example 1, the acoustic impedance $Zg$ of the glass layer (glanova (registered trademark)) was 1.4E+07 (kg/m$^2$·s), the acoustic impedance $Zm$ of the acoustic impedance adjusting layer (PMMA) was 1.7E+06 (kg/m$^2$·s), and the acoustic impedance $Zd$ of the viscoelastic layer (OCA) was 1.8E+05 (kg/m$^2$·s); thus, the relationship of $Zg>Zm>Zd$ was satisfied. Also in Examples 2 and 3, the acoustic impedance $Zm$ of the acoustic impedance adjusting layer (PET) was 3.0 E+06 (kg/m$^2$·s), and the relationship of $Zg>Zm>Zd$ was satisfied.

As can be understood from the Weibull distribution in FIG. 3, values of the ball-point pen fracture height in Comparative Examples 1 and 2 were lower on the whole than values of the ball-point pen fracture height in Examples 1 to 3. In particular, Comparative Example 2 was inferior even to Comparative Example 1. For Comparative Example 2, it can be thought that, because of high reflection of the elastic wave at the interface between the glass layer and $Si_3N_4$ film and substantial coincidence between the position of the antinode of the standing wave and the position of the interface, the maximum stress became twice larger and even a small impact caused fracture. In Comparative Example 2, the acoustic impedance (=3.1E+07 (kg/m$^2$·s)) of the $Si_3N_4$ film provided between the glass layer and viscoelastic layer was larger than the acoustic impedance (=1.4E+07 (kg/m$^2$·s)) of the glass layer.

The cover glasses in which the intensity transmittance of the shock wave propagating from the glass layer to the viscoelastic layer was 10% or higher were excellent in the impact resistance. The upper limit of the intensity transmittance is, for example, 12%, and desirably 13%. When the intensity transmittance is at or above a certain level, performance of the viscoelastic layer in absorbing the shock wave is more likely to be exerted. Therefore, the upper limit of the intensity transmittance is not particularly limited.

INDUSTRIAL APPLICABILITY

The technique disclosed herein is useful for cover glasses used to protect displays. The displays are not limited to those of a particular type, and examples thereof include displays of mobile devices, TV sets, and navigation systems.

The invention claimed is:

1. A cover glass comprising:
a glass layer;
a viscoelastic layer; and
an acoustic impedance adjusting layer disposed between the glass layer and the viscoelastic layer, wherein
a thickness of the glass layer is within a range of from 0.015 to 0.15 mm, and
when an acoustic impedance of the glass layer is $Zg$, an acoustic impedance of the acoustic impedance adjusting layer is $Zm$, and an acoustic impedance of the viscoelastic layer is $Zd$, a relationship of $Zg>Zm>Zd$ is satisfied.

2. The cover glass according to claim 1, wherein the viscoelastic layer and the acoustic impedance adjusting layer are each made of a material transparent to visible light.

3. The cover glass according to claim 1, wherein the viscoelastic layer is composed of an optical clear adhesive film.

4. The cover glass according to claim 1, wherein the impedance adjusting layer is made of at least one resin selected from the group consisting of polyethylene, polymethyl methacrylate, polycarbonate, polypropylene, polyester, polyimide, and polyamide.

5. The cover glass according to claim 1, wherein an intensity transmittance of a shock wave propagating from the glass layer to the viscoelastic layer is 10% or higher.

6. A display comprising:
a display body; and
the cover glass according to claim 1, the cover glass being attached to a screen of the display body.

7. The cover glass according to claim 1, wherein
in a cross section, as viewed from a thickness direction of the cover glass, the viscoelastic layer is disposed on an entire region of the glass layer, and in the cross section, as viewed from the thickness direction, the acoustic impedance adjusting layer is disposed on the entire region of the glass layer.

8. A cover glass comprising:
a glass layer;
a viscoelastic layer; and
an acoustic impedance adjusting layer disposed between the glass layer and the viscoelastic layer, wherein
the impedance adjusting layer is made of at least one resin selected from the group consisting of polyethylene, polymethyl methacrylate, polycarbonate, polypropylene, polyester, and polyimide, and
when an acoustic impedance of the glass layer is Zg, an acoustic impedance of the acoustic impedance adjusting layer is Zm, and an acoustic impedance of the viscoelastic layer is Zd, a relationship of Zg>Zm>Zd is satisfied.

9. A cover glass comprising:
a glass layer;
a viscoelastic layer; and
an acoustic impedance adjusting layer disposed between the glass layer and the viscoelastic layer, wherein
the viscoelastic layer forms the outermost surface of the cover glass, and
when an acoustic impedance of the glass layer is Zg, an acoustic impedance of the acoustic impedance adjusting layer is Zm, and an acoustic impedance of the viscoelastic layer is Zd, a relationship of Zg>Zm>Zd is satisfied.

10. The cover glass according to claim 9, wherein the viscoelastic layer has adhesiveness.

* * * * *